(12) United States Patent
De Rycke et al.

(10) Patent No.: US 7,779,755 B2
(45) Date of Patent: Aug. 24, 2010

(54) SQUARE BALER WITH AN EJECTOR SYSTEM

(75) Inventors: Stefan De Rycke, Zulte (BE); Adrianus Naaktgeboren, Varsenare (BE); Ronald Biebuyck, Veurne (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/419,427

(22) Filed: Apr. 7, 2009

(65) Prior Publication Data

US 2009/0249968 A1  Oct. 8, 2009

(30) Foreign Application Priority Data

Apr. 8, 2008 (EP) .................................. 08154199

(51) Int. Cl.
*B30B 9/30* (2006.01)
*B30B 15/32* (2006.01)
(52) U.S. Cl. .................................. 100/188 R; 100/218
(58) Field of Classification Search .................... 100/7, 100/144, 179, 188 R, 191, 215, 218
See application file for complete search history.

(56) References Cited

U.S. PATENT DOCUMENTS

| | | | |
|---|---|---|---|
| 4,549,840 A | * | 10/1985 | Ansbjer ..................... 414/24.5 |
| 4,791,865 A | | 12/1988 | Naaktgeboren |
| 5,540,144 A | | 7/1996 | Schrag |
| 7,093,537 B2 | | 8/2006 | Dubois |

* cited by examiner

*Primary Examiner*—Jimmy T Nguyen
(74) *Attorney, Agent, or Firm*—Patrick M. Sheldrake; John William Stader; Michael G. Harms

(57) ABSTRACT

A square baler has an ejector system including a shuttle assembly mounted in a wall of the bale case for reciprocation parallel to the direction of movement of the bales in the bale case. A least one dog mounted on the shuttle assembly engages in the last bale in the bale case positioned nearest the discharge outlet and advances the bale incrementally in response to reciprocation of the shuttle assembly. A second shuttle assembly is mounted in a wall of the bale case for reciprocation independently of the first shuttle assembly. The second shuttle assembly has at least one dog to engage in the next-to-last bale in the bale case. By selecting which of the shuttle assemblies to activate, an operator may elect to eject only the last base in the bale case or the last two bales.

8 Claims, 1 Drawing Sheet

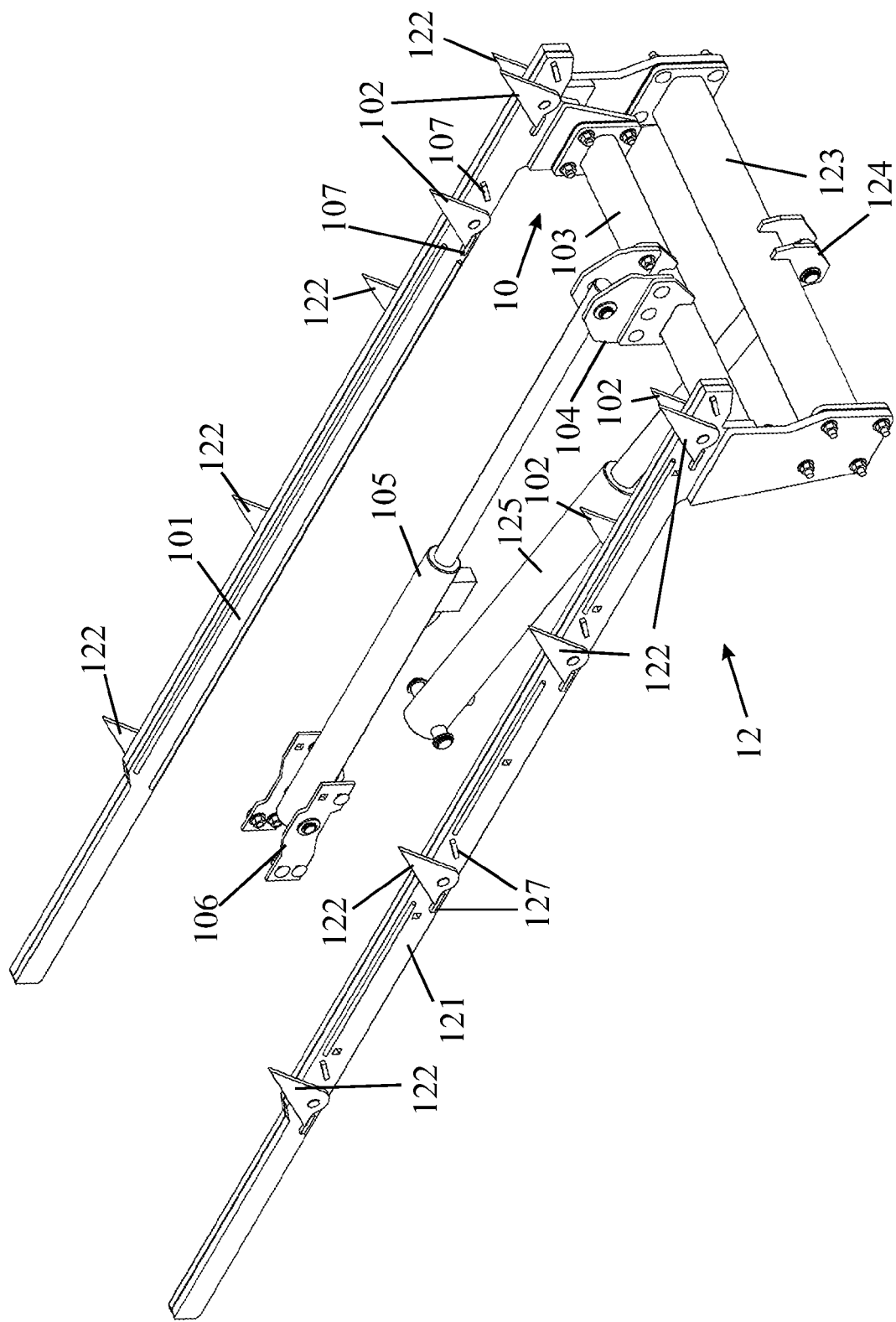

SQUARE BALER WITH AN EJECTOR SYSTEM

FIELD OF THE INVENTION

The present invention relates a square baler having an ejector system.

BACKGROUND OF THE INVENTION

U.S. Pat. No. 5,540,144, which is believed to represent the closest prior art to the present invention, shows a square baler which, instead of using the compacting plunger to unload tied bales from the bale case, comprises an auxiliary ejector system to enable the operator to off-load completed bales. The ejector system comprises a shuttle assembly housed within hollow rails of the bale case. The shuttle assembly consists of a frame that is reciprocated in the direction of movement of the compacting plunger and has dogs projecting upwards from it to engage in the underside of the bales. The dogs grip the bale only during the forward stroke of the shuttle assembly, when it is moving towards the discharge outlet of the bale case, and slip relative to the underside of the bale during the return stroke. In this way, the reciprocation of the shuttle assembly incrementally advances the bales towards the discharge outlet.

The ejector mechanism is controllable to enable the operator to select whether to discharge only the last bale in the bale case (the one nearest the discharge outlet) or both the last bale and the one before it. To achieve this, the dogs are arranged on the shuttle in a longitudinally extending series and at least some of the dogs are controllable by the operator using a selector assembly so that the controlled dogs may be positioned either to extend into the bale case or to be retracted from it.

Apart from the complexity resulting from the need to control dogs individually, the existing ejector systems suffer from the disadvantage that the operator needs first to inspect the position of the bales in the bale case in order to decide on which of the dogs to activate.

OBJECT OF THE INVENTION

The present invention seeks to provide an ejector system for a square baler that mitigates at least some of the foregoing disadvantages of the prior art.

SUMMARY OF THE INVENTION

According to the present invention, there is provided a square baler having a bale case within which crop is compacted by means of a plunger, a discharge outlet at one end of the bale case and an ejector system for advancing bales towards the discharge outlet independently of the movement of the compacting plunger, the ejector system comprising a shuttle assembly mounted in a wall of the bale case for reciprocation parallel to the direction of movement of the bales in the bale case, and at least one dog mounted on the shuttle assembly to engage in the last bale in the bale case positioned nearest the discharge outlet and to advance the bale incrementally out of the discharge outlet in response to reciprocation of the shuttle assembly, characterised in that a second shuttle assembly is mounted in a wall of the bale case for reciprocation independently of the first shuttle assembly, the second shuttle assembly having at least one dog mounted thereon to engage in the next-to-last bale in the bale case.

The second shuttle assembly may conveniently have a series of dogs staggered over its entire length and be capable of advancing bales as far as the discharge outlet of the bale case.

In this case, reciprocation of the second shuttle assembly on its own will suffice to advance both the last bale and the next-to-last bale to the discharge outlet.

Alternatively, the second shuttle assembly may be designed to move the next-to-last bale only as far as a position where it will be taken up by the first shuttle assembly. In this case, both shuttles need to be reciprocated to discharge the next-to-last bale in the bale case.

Without regard to the exact positions of the completed bales in the bale case, the operator may thus elect to discharge only the last bale by operating the first of the shuttle assemblies or to discharge both the last and next-to-last bale by reciprocating the second shuttle assembly either on its own or in conjunction with the first shuttle assembly.

A potential advantage of the present invention is that the dogs do not need to be controlled, i.e. selectively enabled and disabled. In the preferred embodiment of the invention, each dog is pivotably mounted on the shuttle assembly and designed to act in a manner analogous to the pawl of a pawl and ratchet. Thus, each dog will pivot into an extended gripping position during the forward movements of the shuttle to advance the bale towards the discharge outlet and will retract during reverse movements of the shuttle assembly to slip relative to the bale.

When using pivotable dogs, they may be biased into their extended position by gravity or by means of a spring. Alternatively, the dogs may be designed to protrude slightly into the bale case when retracted so that they will be raised automatically into their extended position as they grip into a bale.

BRIEF DESCRIPTION OF THE DRAWINGS

The invention will now be described further, by way of example, with reference to the accompanying drawing.

FIG. 1 is a schematic perspective view of an ejector system using two shuttle assemblies.

DETAILED DESCRIPTION OF THE PREFERRED EMBODIMENT

The integration of an ejector system into a square baler is well documented in the prior art discussed above, having several drawings depicting the manner in which that ejector system is mounted in the baler. In the interest of simplicity, the following description will concentrate on the construction of the ejector system and will only describe the bale case to the extent necessary for an understanding of the invention.

To ensure that it has sufficient rigidity, the floor of the bale case is not formed as a continuous flat surface. The floor can be formed of sheet metal that is bent to provide longitudinally extending channels or it can be formed of separate square section tubes that are welded to cross bars at their ends leaving open grooves between the individual tubes. The shuttle assemblies of ejector systems are designed to sit in such longitudinal grooves, channels or open rails with only their dogs capable of extending upwards above the floor surface on which the bales are supported.

The ejector system in the accompanying drawing comprises two shuttle assemblies 10, 12 arranged one inside the other and are designed to share the same longitudinal grooves or rails in the floor of a bale case.

The first 10 and inner of the two shuttle assemblies comprises two longitudinally extending vertical bars 101 each of which carries on the inner side of its leading end nearest the discharge outlet of the baler two pivotable dogs 102. The number of dogs mounted near the leading end of the inner shuttle assembly is not critical, in as much as a single dog could suffice or one could use more than two dogs, provided that they can only grip the last of the bales in the bale case.

The two bars 101 are connected to one another by a cross bar 103 that lies under the floor of the bale case. A bracket 104 connects the cross bar 103 to a hydraulic cylinder 105, which lies in a channel of the floor and is attached by brackets 106 at its other end to the sides of that channel.

The outer of the two shuttle assemblies 12 comprises two longitudinally extending vertical bars 121 which lie immediately adjacent and back to back with the bars 101 of the first shuttle assembly. Each of these bars 121 carries on its outer side a series of dogs 122. The two bars 121 are connected to one another by a cross bar 123 which lies further below the floor of the bale case than the cross bar 103 of the first shuttle assembly. A bracket 124 connects the cross bar 123 to a hydraulic cylinder 125, which in this case lies entirely beneath the floor of the bale case. The other end of the hydraulic cylinder 125 is connected to a bracket (not shown) that projects downwards from the underside of the floor of the bale case.

The primary purpose of the described design of the two shuttle assemblies is to allow each of the two assemblies to be reciprocated without interfering with the other. The design is also intended to reduce the extent to which the hydraulic cylinders 105, 125 protrude from the underside of the floor of the bale case, this being achieved by housing one of the cylinders 105 within the depth of the floor itself.

Each dog 102, 122 is designed to act as a barbed pawl. As can be seen from the drawing, each dog 102, 122 is triangular in shape and pivotably mounted on it associated bar at a point offset from its centre of gravity so that the natural tendency of each dog is to pivot clockwise (as viewed) into a retracted position. Small stops 107, 127 adjacent each dog pivot act as abutments to limit in both directions the arc through which the associated dog can pivot. In the clockwise direction, the dogs are stopped in a position in which they will slightly protrude above the floor of the bale case into the volume swept by the bales. In the anticlockwise direction, the dogs are stopped in a near vertical position to maximise their extension and their grip on the bales.

The positioning of the ejector system is such that the dogs 102 of the first shuttle assembly 10 can only engage in the last bale in the bale case. When the cylinder 105 is fully retracted, the dogs 102 furthest from the discharge outlet engage near the leading edge (the one nearest the discharge outlet) of the last bale. When the cylinder 105 is fully extended, the dogs 102 nearest the discharge outlet engage near the trailing edge of the last bale. The leading edge of the bale will by then have been advanced onto the exit chute of the baler.

Thus by reciprocating the inner shuttle assembly 10 on its own, the last bale and only the last bale within the bale case will be ejected, provided that its leading edge has reached a position in which it can be gripped by one of the dogs 102 of the first shuttle assembly.

The second shuttle assembly 12 has dogs 122 that can also displace the last bale towards the discharge outlet. However, in contrast to the first shuttle assembly 10, the second shuttle assembly 12 has dogs that reach as far back as the next-to-last bale in the bale case. Consequently, reciprocation of the second shuttle assembly by the cylinder 125 will eject the last and next-to-last bales.

It is not essential for the second shuttle assembly to be able to displace the next-to-last bale as far as the discharge outlet. Instead, it would suffice for the second shuttle to move the next-to-last bale to a position from which it can be taken up by the first shuttle assembly. It is therefore possible to locate the second shuttle assembly entirely behind the first, instead of the two being arranged side by side as shown. In such an embodiment, the second shuttle assembly may simply be a duplicate of the first, allowing the two assemblies to be made from similar if not identical components. Such an embodiment can reduce the extent to which the ejector system protrudes beneath the floor of the bale case as the two cross bars 103 and 123 may now both be arranged at the same horizontal level and both cylinders 105 and 125 can be accommodated within the depth of the floor. A further advantage of such an embodiment is that the cylinder 125 would not be required to have sufficient power to displace two bales at the same time.

We claim:

1. A square baler having a bale case within which crop is compacted by a plunger, a discharge outlet at one end of the bale case and an ejector system for advancing bales towards the discharge outlet independently of the movement of the compacting plunger, the ejector system comprising:

a first shuttle assembly mounted in a wall of the bale case and having a first reciprocating elongate member configured for reciprocation parallel to a direction of movement of bales in the bale case;

at least one dog mounted on the first reciprocating elongate member of the shuttle assembly to engage in a last bale in the bale case positioned nearest the discharge outlet and configured to advance the bale incrementally out of the discharge outlet in response to reciprocation of the first reciprocating elongate member of the first shuttle assembly; and a second shuttle assembly mounted in a wall of the bale case and having a second reciprocating elongate member configured for reciprocation independently of the first shuttle assembly, the second shuttle assembly having at least one dog mounted to the second reciprocating elongate member of the second shuttle assembly to engage in a next-to-last bale in the bale case and configured to advance the bale towards the outlet in response to reciprocation of the second reciprocating elongate member of the second shuttle assembly, wherein the first reciprocating elongate member and the at least one attached dog of the first shuttle assembly are movable with respect to the second reciprocating elongate member and at least one dog of the second shuttle assembly.

2. A baler as claimed in claim 1, wherein the second shuttle assembly has a series of dogs staggered over its entire length and is configured to advance bales as far as the discharge outlet of the bale case.

3. A baler as claimed in claim 1, wherein the elongate members of the first and second shuttle assemblies, each having a pair of longitudinally extending bars configured to carry the dogs and which are arranged parallel in the same wall of the bale case, wherein the pair of bars of the first shuttle assembly are configured to be actuated independently of the pairs of bars of the second shuttle assembly.

4. A baler as claimed in claim 1, wherein the second shuttle assembly is configured such that the dogs of the second shuttle assembly move the next-to-last bale only as far as a position where it can be engaged be taken up by the first shuttle assembly.

5. A baler as claimed in claim 1, wherein each dog is pivotally mounted on the elongate members of the first and second shuttle assemblies and the dogs are configured to pivot into an extended gripping position during the forward movements of the elongate member to which they are mounted and to advance the bale towards the discharge outlet and to retract during reverse movements of the elongate member to which they are mounted to slip relative to the bale, wherein the elongate member of the first shuttle assembly is movable with respect to the elongate member of the second shuttle assembly.

6. A baler as claimed in claim 5, wherein the dogs are pivoted about a point offset from their centre of gravity and biased by their own weight into a retracted position in which they project only slightly into the volume of the bale case swept by the bales.

7. A baler as claimed in claim 6, wherein a stop is associated with each dog and configured to limit the forward and rearward extents of the arc through which the dog can pivot.

8. A square baler having a bale case within which crop is compacted by a plunger, a discharge outlet at one end of the bale case and an ejector system for advancing bales towards the discharge outlet independently of the movement of the compacting plunger, the ejector system comprising:

a first shuttle assembly mounted in a wall of the bale case and configured for reciprocation parallel to a direction of movement of bales in the bale case;

at least one dog mounted on the first shuttle assembly to engage in a last bale in the bale case positioned nearest the discharge outlet and configured to advance the bale incrementally out of the discharge outlet in response to reciprocation of the shuttle assembly; and a second shuttle assembly mounted in a wall of the bale case and configured for reciprocation independently of the first shuttle assembly, the second shuttle assembly having at least one dog mounted to engage in a next-to-last bale in the bale case and move the next-to-last bale only as far as a position where it can be engaged by the dogs of the first shuttle assembly for movement out of the discharge outlet independent of the reciprocation of the second shuttle assembly.

* * * * *